Oct. 10, 1944.  E. P. HOUSSIERE  2,360,133
CONVERTIBLE VEHICLE FLOOR
Filed Feb. 24, 1943   2 Sheets-Sheet 1
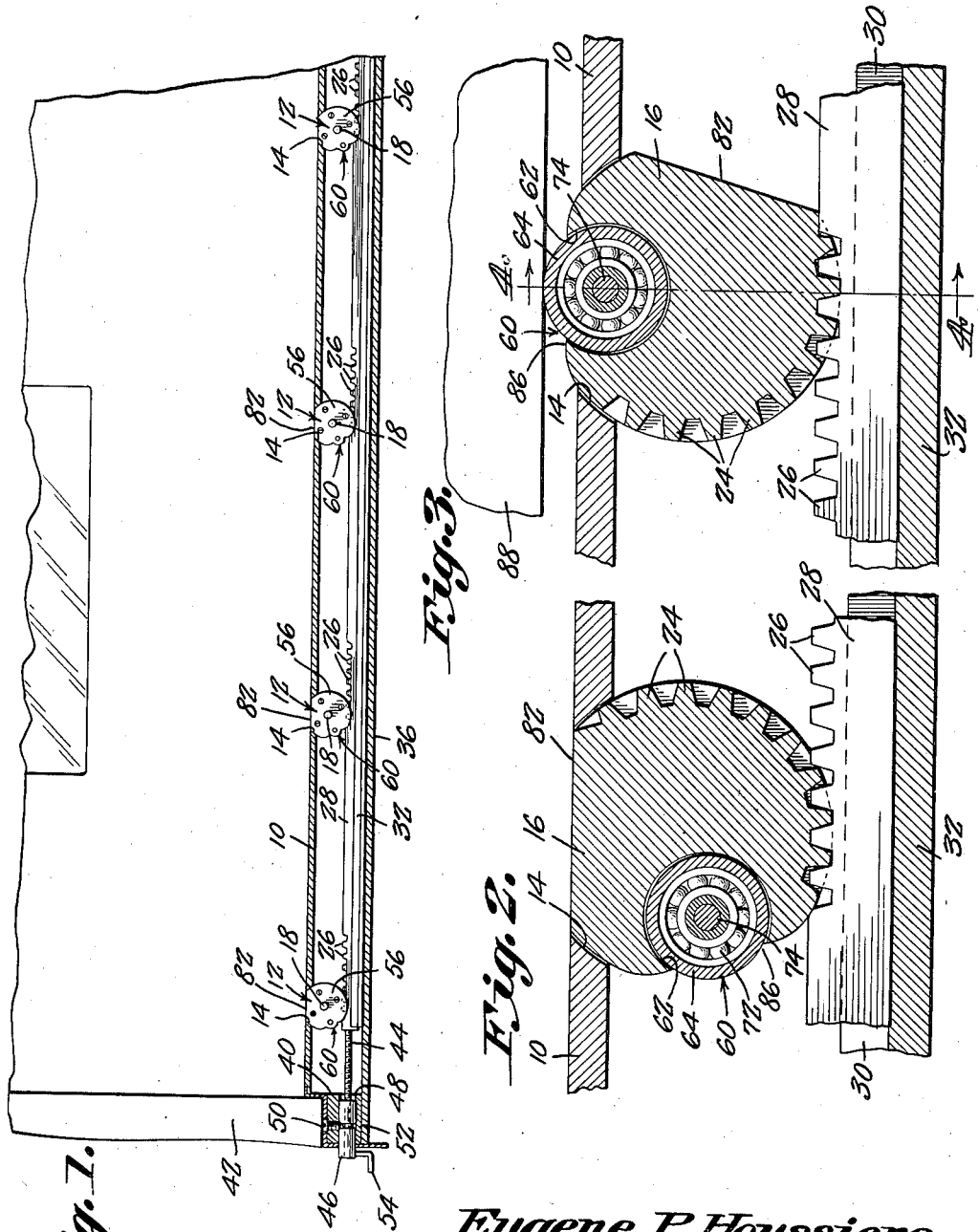
Eugene P. Houssiere,
INVENTOR.
BY
Victor J. Evans & Co.
ATTORNEYS Oct. 10, 1944.  E. P. HOUSSIERE  2,360,133
CONVERTIBLE VEHICLE FLOOR
Filed Feb. 24, 1943  2 Sheets-Sheet 2

Eugene P. Houssiere INVENTOR,
BY
Victor J. Evans & Co.
ATTORNEYS

Patented Oct. 10, 1944

2,360,133

UNITED STATES PATENT OFFICE 2,360,133

CONVERTIBLE VEHICLE FLOOR

Eugene P. Houssiere, Jennings, La.

Application February 24, 1943, Serial No. 476,961

3 Claims. (Cl. 296—16)

My invention relates to casket carriers, and has among its objects and advantages the provision of novel means which may easily be associated with the floor of an automotive vehicle, such as an ambulance, to the end that the ambulance may perform its normal functions in every respect, but wherein said means are of such construction that casket supporting rollers may be elevated through and partly above the floor by an easily operated adjustment, thereby transforming an ambulance into a funeral coach so that one vehicle may perform a twofold function.

In the accompanying drawings:

Figure 1 is a longitudinal sectional view of the greater portion of an ambulance floor showing my invention incorporated therein.

Figure 2 is a cross sectional view of one of the casket roller assemblies in its normal position flush with the floor of the ambulance.

Figure 3 is a similar view showing the roller assembly adjusted to a casket supporting position.

In the embodiment of the invention selected for illustration, I make use of an automotive vehicle floor 10, such as in an ambulance. Underneath the floor 10 are mounted a series of identical load or casket supporting roller assemblies 12, which assemblies are arranged transversely of the vehicle floor and spaced at suitable intervals. A corresponding number of slots 14 is provided in the floor 10 to expose peripheral margins of the roller assemblies.

Figure 4:
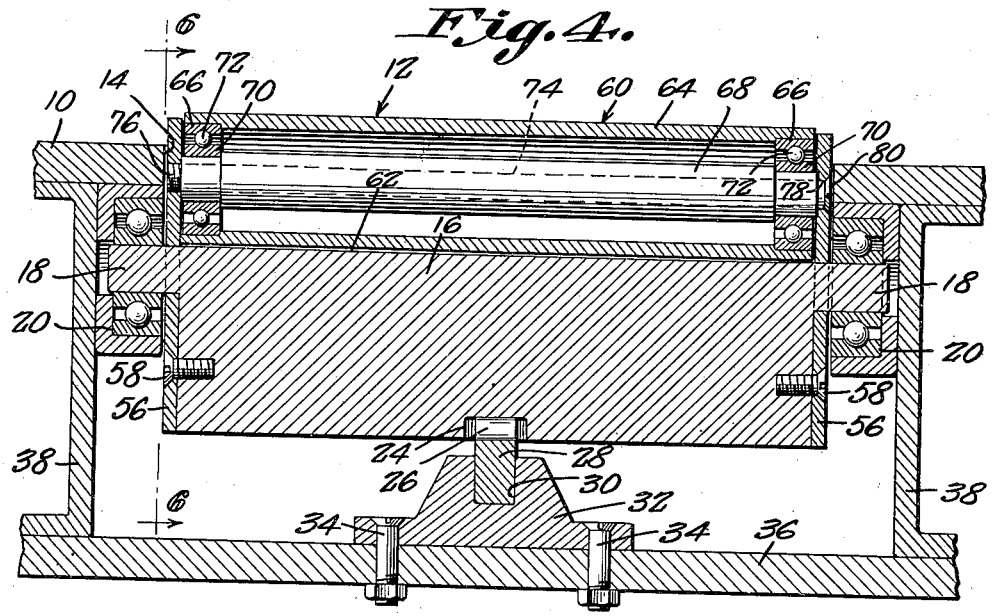
Figure 4 is a sectional view along the line 4—4 of Figure 3.
Figures 5, 6:
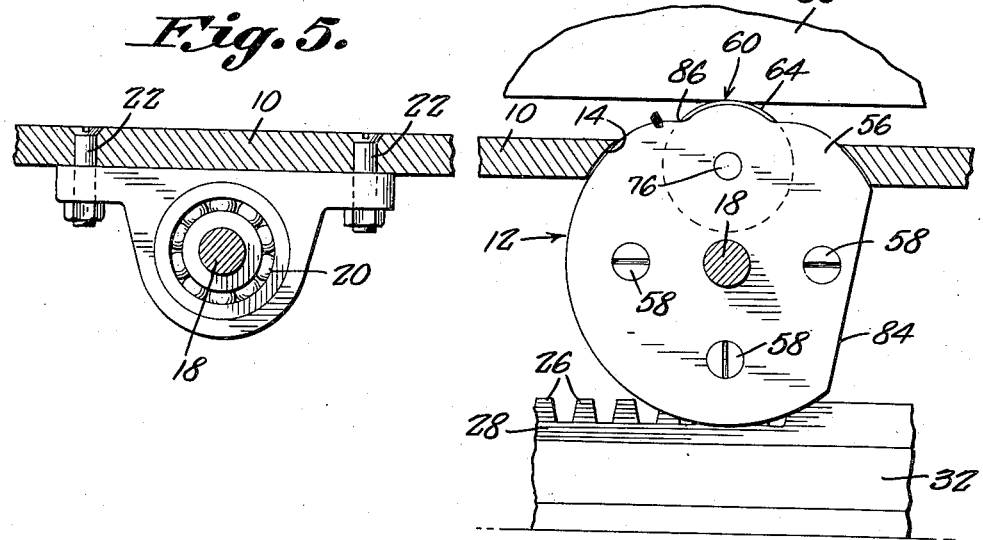
Figure 5 is an end view of a bearing.
Figure 6 is a view taken from the position indicated by line 6—6 of Figure 4.

In Figures 2, 3 and 4, the roller assembly 12 comprises a substantially cylindrical body 16 having coaxial end shafts 18 supported in roller bearings 20, which are attached to the floor 10 by bolts 22, as in Figure 5. The bolt heads lie flush with the upper face of the floor. Means for rotating the body 16 comprise gear teeth 24 cut in the body and spaced circumferentially of the body. These teeth mesh with rack teeth 26 cut in a bar 28, this bar being slidably guided in a groove 30 in a body 32 bolted at 34 to a lower floor 36 suspended from the floor 10 by supporting channels 38, which may be bolted to both floors 10 and 36.

The bar 28 lies at right angles to the bodies 16 and terminates a short distance forwardly of a beam 40 at the rear end of the floor 10 and the vehicle body 42. A screw 44 is fixed to the rear end of the bar 28 and is threadedly connected with a sleeve 46 rotatably supported in a bore 48 in the beam 40. This sleeve is restrained from endwise movement by a screw 50 threaded through the beam and fitting loosely in a groove 52 in the sleeve 46. A crank 54 is attached to the sleeve 46 to facilitate rotation thereof.

A plate 56 is attached to both ends of the body 16, see Figure 4, as by screws 58 in Figure 6. A load or casket engaging roller 60 is mounted on the plates 56, which roller lies in a correspondingly shaped groove 62 in the body 16. The roller 60 comprises a sleeve 64 having outer bearing races 66 pressed in both ends of the sleeve. A spacing tube 68 extends longitudinally inside the sleeve 64 and is provided with inner bearing races 70, between which and the races 66 are interposed ball bearings 72.

A bolt 74 extends lengthwise through the tube 68 and has one end threaded at 76 into one of the plates 56. The other end extends through an opening 78 in the other plate 56, and is provided with a screw head 80 countersunk in the outer face of the adjacent plate 56. Thus the tube 68 is held in firm endwise engagement with the two plates 56.

The body 16 is provided with a flat face 82 which lies flush with the upper face of the floor 10 when the body 16 is in the position of Figure 2, the face 86 completely filling the slot 14 so that the floor 10 will have an unbroken surface. The plates 56 also have flat faces 84. Both the body 16 and the plates 56 are cut away at 86 to expose the necessary face area of the sleeve 64, although the sleeve lies within the circumferential contour of the body 16, so that the slot 14 will be completely filled in substantially all positions of the body 16.

In Figure 1, all the roller assemblies 12 lie in the same relative positions, and the roller assemblies are simultaneously rotated in like degrees through endwise movement of the bar 28. The roller assemblies are easily and quickly turned to the load supporting position of Figures 3, 4 and 5 through rotation of the sleeve 46. With the roller assemblies in the position of Figures 3 and 6, the sleeves 64 are positioned sufficiently far above the floor 10 to support the load or casket 88 above the floor 10, so that the load may be easily rolled into or out of the vehicle.

Without further elaboration, the foregoing will so fully explain my invention, that others may, by applying current knowledge, readily adapt the same for use under various conditions of service.

I claim:

1. In an automotive vehicle, the combination of a floor having slots, rotary bodies supported underneath said floor and extending partly through said slots to close the latter, said bodies having flat faces adapted to lie flush with the upper face of said floor in one position of the bodies, load carrying rollers mounted on said bodies to one side of said flat faces, and means for turning said bodies to a second position for projecting said rollers through said slots to load carrying positions above said floor.

2. In an automotive vehicle, the combination of a floor having slots, load carrying rollers normally lying beneath said floor, and means for projecting said rollers through said slots to load carrying positions above said floor, said means comprising substantially cylindrical bodies having gear teeth, said bodies having peripheral margins extending into said slots to normally fill the slots, said peripheral margins being in the nature of flat faces lying flush with the top face of the floor, said rollers being mounted to one side of said flat faces and partly housed in longitudinal grooves in the bodies, a rack means meshing with said gear teeth, and a screw means for imparting movement to said rack means for rotating said bodies.

3. In an automotive vehicle, the combination of a floor having slots, load carrying rollers normally lying beneath said floor, means for projecting said rollers through said slots to load carrying positions above said floor, said means comprising cylindrical bodies having longitudinal grooves substantially housing said rollers, plates at the ends of said cylindrical bodies rotatably supporting said rollers, roller bearing means interposed between said rollers and said plates, and a gear means acting on said bodies to simultaneously turn the same in like amounts.

EUGENE P. HOUSSIERE.